Patented Mar. 28, 1933

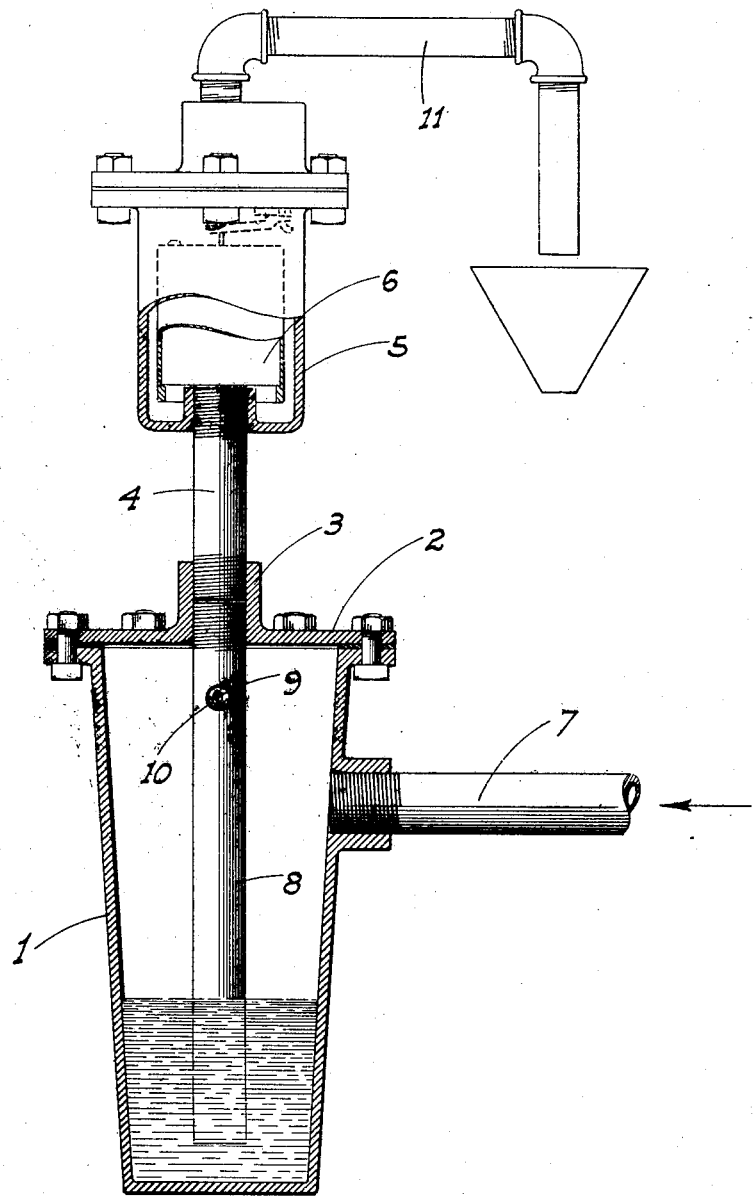

1,903,246

UNITED STATES PATENT OFFICE

LOUIS E. SANDERS, OF SACRAMENTO, CALIFORNIA

STEAM CONDENSING WELL

Application filed April 5, 1932. Serial No. 603,260.

This invention relates to attachments for steam traps, my principal object being to provide such an attachment as will materially increase the water holding capacity of the system and will prevent the trap from discharging so frequently and which is a cause of rapid wear and deterioration of the delicately moving parts of the trap.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

The figure on the drawing is a sectional elevation of my improved attachment shown mounted in connection with a standard form of steam trap.

Referring now more particularly to the characters of reference on the drawing, the numeral 1 denotes a well of suitable capacity having a removable cap 2 provided with a tapped boss 3 for the support of a nipple 4 by means of which connection is made with the steam trap in place of the usual steam intake pipe. In the present instance the trap 5 is shown as being of the inverted bucket type, the bucket 6 of which is raised to hold the outlet valve closed by the steam pressure entering the bucket from the bottom through the intake nipple 4. Said nipple however can be connected, in place of the ordinary steam intake pipe, to a trap of the water-controlled bucket type, since my attachment will function equally well with either type of trap.

The steam intake pipe 7, which is a drain pipe from the main steam line of the system, is connected to the well on one side a certain distance below the cap; this pipe being the one which is usually connected direct to the trap. Secured in and depending from the cap box 3 so as to aline and communicate with the nipple 4 is a tube 8, the lower end of which is open and terminates a short distance from the bottom of the well. A steam bleed hole 9 is provided in the tube above the plane of the pipe 7 and in non-facing relation thereto. If the tube is of corrodible metal such as ordinary wrought iron pipe this hole is prevented from clogging up by rust by placing the same in a plug 10 of non-corrosive metal which is secured in a larger hole initially drilled through the tube.

In operation the steam entering the well passes freely through the tube 8 and into the trap bucket to hold the trap valve closed until the bottom of the tube is closed by an accumulation of condensate. The steam then continues to enter the trap bucket through the bleed hole 9 still holding the trap valve closed. The steam having then no outlet from the trap it condenses therein in the usual manner, but at the same time the condensate is also accumulating in the well.

When the trap has accumulated sufficient condensate for the valve to be opened and the trap sprung in the manner in which such traps ordinarily function, the steam pressure in the pipe 7 will not only cause the trap to be emptied of such condensate but the well also, the discharge taking place through the pipe 11 at the top of the trap. When the discharge and drainage from the trap and well has been completed the trap valve is again closed by the steam from the well as before until the condensate again accumulates to the necessary quantity, whereupon the above action is repeated.

The same results are obtained when the well is connected to a water bucket trap. With such a trap the steam condenses in the bucket of the trap at the same time as in the well. When the bucket trips by filling with water in the usual manner the steam pressure from below also empties the well and forces the water into the trap. As soon as the bucket is empty it raises as usual and seals the trap, thus equalizing the pressure in the line. If the water is forced up in the tube by the steam pressure until the hole 9 is closed, the complete flow of steam to the trap is of course shut off. This will cause the latter to function and drain even if its own accumulation of condensate is not sufficient for it to do so.

The steam bleed-hole is disposed in non-facing relation to the steam intake so as to break or prevent a direct current or flow of steam from the intake to the trap, so as to quiet down the steam as it thus flows. This arrangement also makes the steam stop in the well for a certain time, without which action the well would be of no value.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination with a steam trap having a steam inlet, a well below the trap, said well being closed on top, a conduit extending upwardly from inside the well and through the top thereof to a connection with the steam inlet of the trap, said conduit being open at the bottom and terminating a short distance from the bottom of the well, and a steam inlet passage to the well toward the top; the conduit having a steam bleed opening therein within the well but above the plane of the steam inlet.

2. In combination with a steam trap, having a steam inlet, a well below the trap, said well being closed on top, a conduit extending upwardly from inside the well and through the top thereof to a connection with the steam inlet of the trap, said conduit being open at the bottom and terminating clear of the bottom of the well, and a steam inlet passage in one side of the well toward the top; the conduit having a steam bleed opening therein below the top of the well and in non-facing relation to the inlet passage.

In testimony whereof I affix my signature.

LOUIS E. SANDERS.